United States Patent [19]

Horan et al.

[11] Patent Number: 5,113,485
[45] Date of Patent: May 12, 1992

[54] OPTICAL NEURAL NETWORK SYSTEM

[75] Inventors: Paul Horan, Dublin, Ireland; Akira Arimoto, Kodaira, Japan

[73] Assignee: Hitachi, Ltd., Tokyo, Japan

[21] Appl. No.: 615,081

[22] Filed: Nov. 19, 1990

[30] Foreign Application Priority Data

Nov. 22, 1989 [JP] Japan .................. 1-302129

[51] Int. Cl.$^5$ .................. G03H 1/12; G06G 7/16
[52] U.S. Cl. .................. 395/25; 364/822
[58] Field of Search .................. 364/513, 807, 822; 395/25

[56] References Cited

U.S. PATENT DOCUMENTS

| 4,843,587 | 6/1989 | Schlunt et al. | 364/822 |
| 4,862,406 | 8/1989 | Fisher | 364/807 |
| 4,986,640 | 1/1991 | Athale et al. | 364/822 |
| 5,004,309 | 4/1991 | Calfield et al. | 364/822 |
| 5,056,039 | 8/1991 | Caulfield et al. | 364/513 |

FOREIGN PATENT DOCUMENTS 2176281A 12/1986 United Kingdom .................. 395/25

OTHER PUBLICATIONS

"Compact architectures for adaptive neural nets", Athale et al., Optical Engineering, vol. 28 No. 4, Apr. 1989.
"Optical computing: The Coming Revolution in Optical Signal Processing", Laser Focus/Electro-Optics, Nov. 1983.
C. Lee Giles et al., "Learning, Invariance, and Generalization in High-Order Neural Networks", Applied Optics, vol. 26, No. 23, Dec. 1, 1987, pp. 4972-4978. (Provided in English)
"Rapid Communications", Applied Optics, vol. 21, No. 12, June 14, 1982, pp. 2089-2090. (Provided in English).

Primary Examiner—Michael R. Fleming
Assistant Examiner—George Davis
Attorney, Agent, or Firm—Fay, Sharpe, Beall, Fagan, Minnich & McKee

[57] ABSTRACT

An optical system of an optical neural network model for parallel data processing is disclosed. Taking advantage of the fact that an auto-correlation matrix is symmetric with respect to a main diagonal and the weights for modulating the values of diagonals of the auto-correlation matrix are equal to each other, the configuration of an optical modulation unit is simplified by a one-dimensional modulation array on the one hand, and both positive and negative weights are capable of being computed at the same time on the other hand. In particular, the optical system makes up a second-order neural network exhibiting invariant characteristics against translation and scale.

6 Claims, 6 Drawing Sheets

F I G. 7
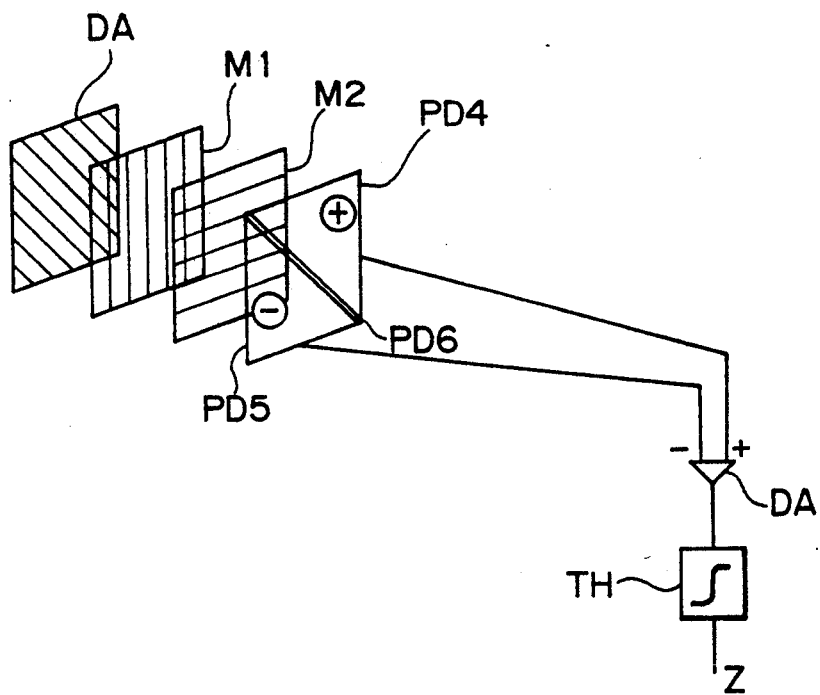
F I G. 8
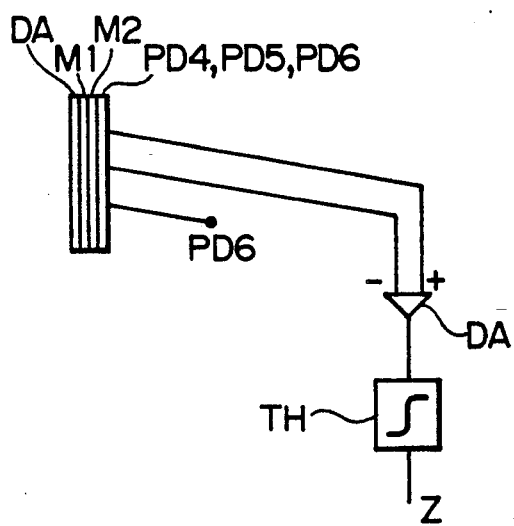

REFLECTION GEOMETRY

EXAMPLE OF ROTATION OPTICS.

PRISM FLIPS VERTICAL
= ROTATION THROUGH 90°
FOR 45° IMAGE

OPTICAL NEURAL NETWORK SYSTEM

BACKGROUND OF THE INVENTION

The present invention relates to an optical system of an optical neural network model for parallel data processing.

The output $y_i$ of a second-order neural network where all inputs are connected in pairs, is given by $$y_i = F_{Th}\left(\sum_{j=1}^{N} \sum_{k=j+1}^{N} w_{ijk} x_j x_k\right) \quad (1)$$

where $x_j$, $x_k$ are the same input vector of length N, $w_{ijk}$ is a weight matrix, and $F_{Th}$ is a threshold function. When $w_{ijk}$ values are suitably adjusted during a training stage, then the binary output $y_i$ can differentiate between two possible input classes. The equation (1) is disclosed in Applied Optics, Vol. 26, No. 23, pp 4972–4978, (1987).

This system can be made invariant to a functional transformation of the input by imposing certain conditions on the weight matrix $w_{ijk}$, which reflect the symmetry of the particular transformation. The case of invariance to the geometric operations of scaling and translation may be achieved by the condition that $$w_{ijk} = w_{ij'k'} \text{ if } j-k = j'-k' \quad (2)$$

Thus all elements of the set $x_j x_k$ where $j-k=$ constant are multiplied by the same weight.

A general scheme for optical implementation of this model has been outlined previously. Particular optical architectures for calculation of the auto-correlation matrix have also been described previously, in Applied Optics, Vol. 21, No. 12, pp 2089–2090, (1982). However, these architectures are complex.

SUMMARY OF THE INVENTION

The auto-correlation matrix $x_j x_k$ with a four-element input vector as an example and the related weight will be explained with reference to FIG. 2. In the auto-correlation matrix $x_j x_k$ satisfying the conditions of equation (2), the direction specified by the element $j-k=0$ is used as a diagonal, and in particular, the diagonal along the direction specified by the element $j-k=0$ is assumed to be a main diagonal. Also, the element of each diagonal is represented by the one defined by each oblique line shown in FIG. 2, with all diagonals having an equal weight value. FIG. 2 further shows the symmetry of this auto-correlation matrix.

The object of the present invention is to provide an optical system with an optical configuration thereof capable of being simplified by the use of the fact that each diagonal of a weight matrix has the same value and that the auto-correlation matrix is symmetric with respect to the main diagonal, in which both the positive and negative weights are capable of being computed at the same time, or more in particular, to provide an optical system configuring a second-order neural network remaining invariant with the translation and scale.

According to the present invention, there is provided an optical system taking advantage of the fact that the weight value of each diagonal of a auto-correlation matrix is equal and that the auto-correlation matrix is symmetric with respect to the main diagonal, comprising a first modulation unit for producing a vector product (auto-correlation matrix) of the very input, a second modulation unit for multiplying each term of a matrix obtained by a related weight, and a detection unit for producing the total of the terms on both sides of the main diagonal of the auto-correlation matrix.

According to a first aspect of the present invention, the first modulation unit, which has the function of modulating the light in accordance with an input signal to produce an auto-correlation matrix symmetric with respect to a main diagonal, includes a pair of modulation arrays arranged at right angles to each other. The first modulation unit may alternatively be configured of a one-dimensional linear light source array and a modulator arranged at right angles thereto.

According to a second aspect of the present invention, the second modulation unit includes a focus optical system for focusing the output light of the first modulation unit along the direction perpendicular to the main diagonal of the auto-correlation matrix and a one-dimensional modulation array for modulating the light focused by the focus optical system in accordance with weights. The second modulation unit may alternatively be configured of a plurality of light sources arranged in predetermined directions for producing the intensity-modulated light in accordance with weights. Such light sources are preferably a one-dimensional array arranged in the direction perpendicular to the main diagonal of the auto-correlation matrix or a surface light-emitting array having a plurality of lines for separating a light-emitting region along a direction parallel to the main diagonal.

According to a third aspect of the present invention, the detection unit includes a photodetector for producing the inner product of the elements on the main diagonal of the auto-correlation matrix, which inner-product output may be used for error monitoring or threshold control.

In an optical system according to the present invention capable of exhibiting invariant characteristics against the translation and scale, the weight matrix may be configured of a one-dimensional modulation array by utilizing the fact that the weight values of the respective diagonals of an auto-correlation matrix are equal to each other, thereby simplifying the optical configuration for weight multiplication. Further, if the symmetry of the required information (input vector) with respect to the main diagonal of the auto-correlation matrix is used appropriately, it is possible to divide the matrix into two matrix data with respect to the main diagonal and multiply both the positive and negative weights at the same time.

BRIEF DESCRIPTION OF THE DRAWINGS

FIG. 7 is a view showing a variant embodiment wherein the device of FIG. 6 is made more compact.

FIG. 8 is a view showing three dimentional integration of the devices in FIG. 7.

DESCRIPTION OF THE PREFERRED EMBODIMENTS

Figure 1:
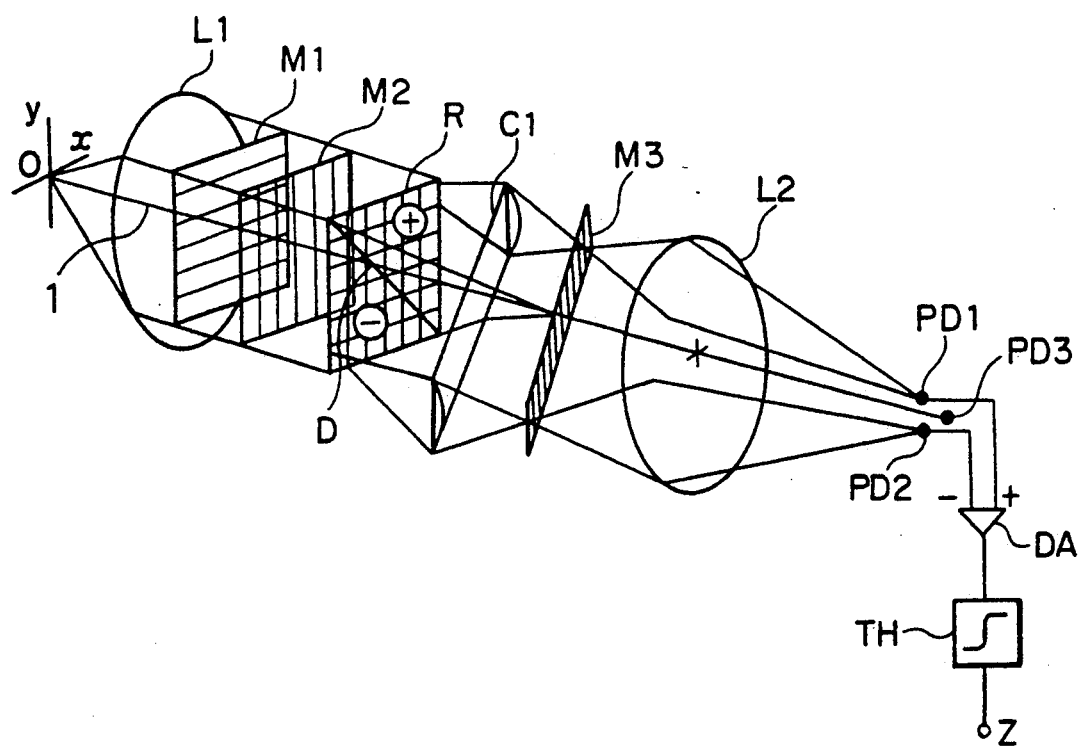
FIG. 1 is a view showing an optical system according to an exemplary embodiment of the present invention.
Figure 2:
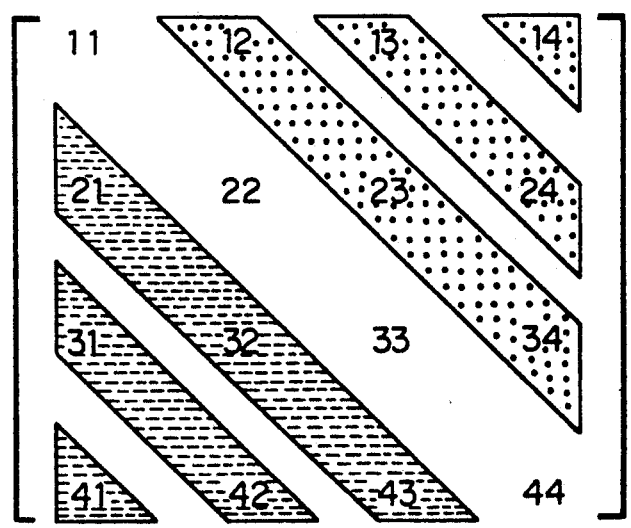
FIG. 2 is an example of the auto-correlation matrix and associated weight matrix diagonal symmetry.

FIG. 1 shows an embodiment of a general optical system aligned along an optical axis 1. Light from a source 0 is collimated by a lens L1 to provide uniform illumination of a pair of crossed binary transmission modulators M1 and M2. The modulators M1 and M2 comprises N addressable strips, who's transmission may be varied between a high and a low state. The number of elements N is equal to the number of elements of the input vector. The modulators M1 and M2 may be addressed by a number of possible means, such as electrically addressable electro-optic devices or optically addressable bistable devices, for example. The input vector is fed to both M1 and M2 and their combined transmission gives a real image, R, of the outer product of the input vector with itself, which is the auto-correlation matrix. This matrix is symmetrical about the main diagonal D. The elements of each diagonal must now be multiplied by their associated weights. This is achieved using a cylindrical lens C1 orientated orthogonally to the main diagonal D. Such a lens can bring all the elements from each diagonal to the same focus. At the focus of C1 is placed a modulator M3, which has a number of discrete transmission levels. This modulator M3 institutes the weight multiplication. The number of discrete transmission levels required is determined by the particular patterns used during training and the training rule used. As for modulators M1 and M2, the modulator M3 may be electrically or optically addressed.

The symmetry of the auto-correlation matrix provides two versions of the information required for a second order network, one to either side of the main diagonal D by the modulator M3. The dual versions are used to institute simultaneous calculation of positive and negative weights. If a weight is greater than zero, it is applied to the element of the modulator M3 addressing the + side of the matrix R, and a zero applied to the equivalent element addressing the − side of R. If a weight is negative, it is applied to the element addressing the − side of R, and zero applied to the equivalent element addressing the + side of R. Since there are N-1 independent diagonals, and thus weights, on each side of the main diagonal, (the main diagonal is not required) the modulator M3 must contain 2N-2 addressable elements to implement both positive and negative weights. After modulation by M3 the resulting light matrix must be summed. This is achieved by lens L2. All the light from the + side of the matrix is focused to photodetector PD1, and all the light from the − side of the matrix is focused to photodetector PD2. PD1 and PD2 provide electrical output proportional the total light intensity in each sector of the weighted matrix. The required summation is achieved by combining the outputs of both photodetectors in a differential amplifier DA. The output of the differential amplifier DA is then thresholded in a device TH to give a binary output Z, which indicates the class of the input with respect to the two training examples.

An additional feature of this system is that the main diagonal, which is not required for the primary function, provides the individual terms of the vector inner (scaler) product with itself. The summation of these terms may be monitored by a third photodetector PD3 suitably positioned between PD1 and PD2. For the binary input of this system the output of PD3 is the sum of non-zero terms in the input vector and may be used for error monitoring or variable control of the threshold device TH.

Figure 3:
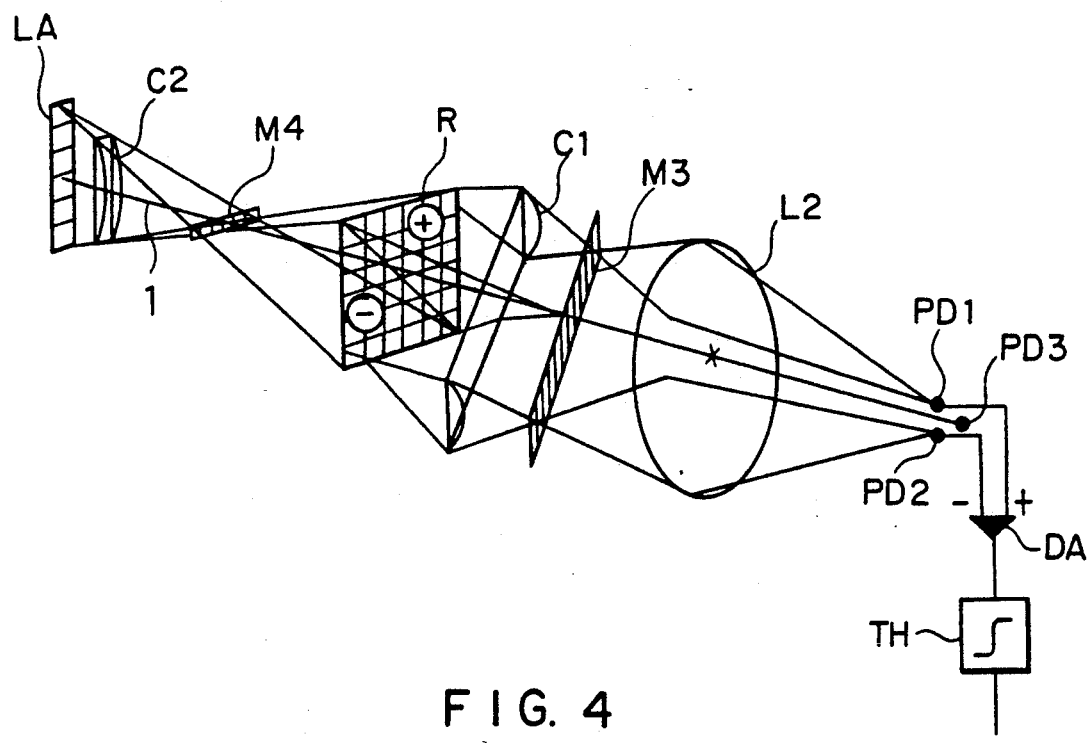
FIG. 3 is a view showing a variant embodiment of the optical system illustrated in FIG. 1.

A feature of this optical system is that a real image of the auto-correlation matrix is produced. FIG. 3 shows a variation on the optical system of FIG. 1 where the real image of the auto-correlation R is produced in an alternative fashion. A linear light source array LA, of N elements, such as a light emitting diode (LED) or laser diode (LD) array, is modulated in a binary fashion with the input vector. Natural divergence and a cylindrical lens C2 are used to smear the output of array LA across an orthogonal binary transmission modulator linear array M4. If the natural divergence of the individual light sources in the array LA is insufficient to fully illuminate M4, a second orthogonal cylindrical lens crossed to the cylindrical lens C2 may be required. The modulator M4 should have the same transmission characteristics as described for M1 and M2 of FIG. 1. M4 is also modulated with the same input vector as the input vector regarding the modulation of LA. This combination will yield a real image of the auto-correlation matrix R. Thereafter the system is as described for FIG. 1. Further alternative variations of this scheme where the modulation of the input vector is achieved by acousto-optic modulators or other electro-optic devices can be envisaged.

Figure 4:
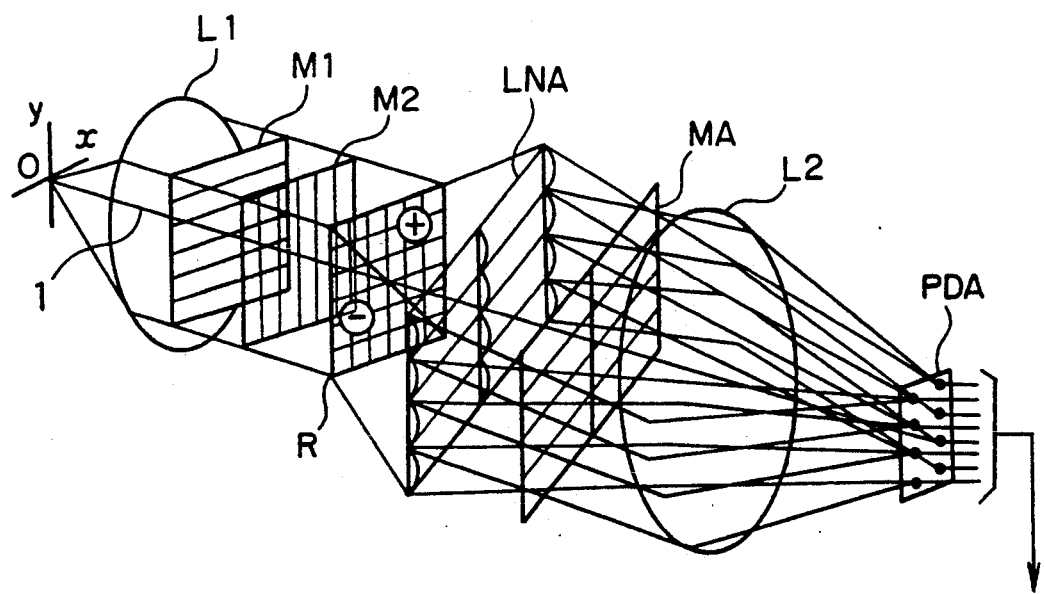
FIG. 4 is a view showing a variant embodiment of the optical system whereby multiple discrimination is possible.

The invention, as described above, is capable of discriminating between two classes only, since the system as described has only a single binary output. For a system with M binary output modes, it is possible to discriminate between $2^M$ possible classes. Such a variation of the invention is illustrated in FIG. 4. A real image of the auto-correlation matrix is produced as previously described. It may be necessary to introduce a diffusing screen at the position indicated for the real image R in FIG. 4. Rather than a single cylindrical lens and modulator combination, as described previously, an array of cylindrical lens' and multi-valued modulators, all oriented at 45°, are used to feed to M separate photodetector pairs in a photodetector array PDA via a lens L2. Each photodetector pair of the array receives light from half of the total matrix, and is connected to electronics, the individual sub-systems are as disclosed in FIGS. 1 and 3. Each cylindrical lens/modulator/photodetector pair combination can perform a single binary discrimination. The combination of M binary outputs allows discrimination between $2^M$ classes.

Figure 5:
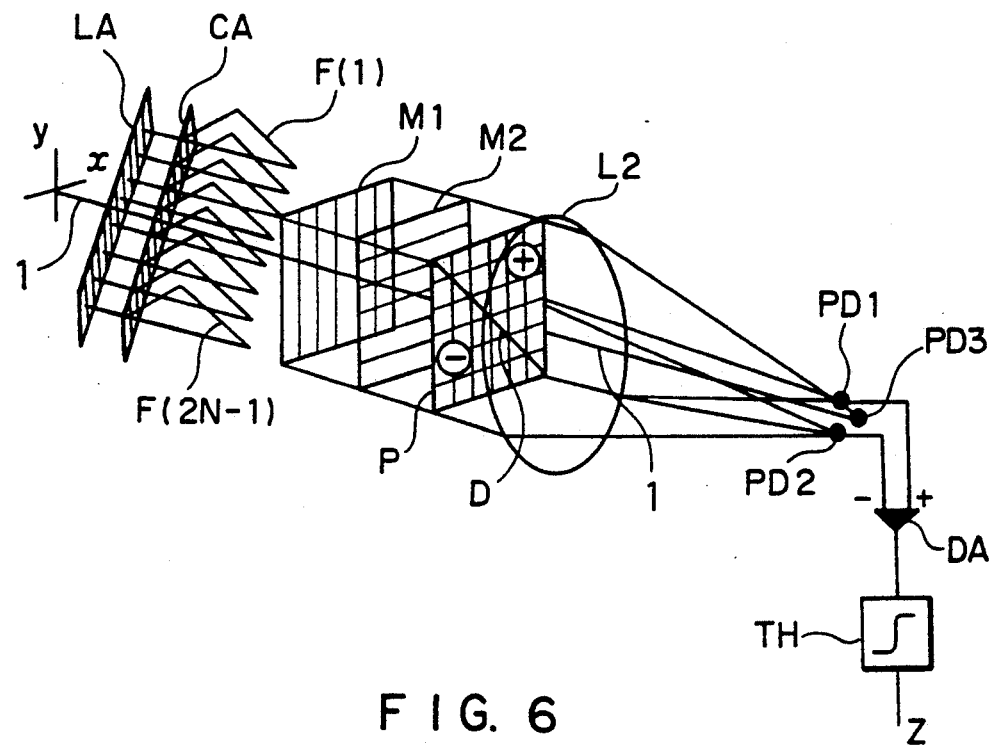
FIG. 5 is a view showing a further preferred embodiment of the invention.

A drawback with the schemes described above is that the transmission modulation device M3 or the elements constituting the array LA used for the weight multiplication, requires many discrete transmission states (gradation displaying). This produces certain technical difficulties, as most transmission modulation devices are optimized for binary behavior. An alternative preferred embodiment of the invention which avoids the need for such a device is shown in FIG. 5. A pair of crossed modulators M1 and M2, as described in FIG. 1, are used to provide the auto-correlation. Rather than the uniform illumination described for FIG. 1 the diagonals of the combined transmission of M1 and M2 are individually illuminated. This is achieved using a linear array of 2N-2 light sources LA, orientated at 45° to the modulators, and orthogonal to the principle diagonal of the auto-correlation matrix. The light from each individual light source is collimated into a strip using a cylindrical lens array CA to provide 2N-2 light strips, F(1) to F(2N-2), which illuminate the individual diagonals. The weight multiplication for each diagonal is achieved by suitable modulation of the light output intensity of each individual light source. The choice of 2N-2 light sources allows institution of positive and negative weights as described previously. The image P transmitted by M2 is the auto-correlation matrix multiplied by the associated weights. This is summed by lens L2, imaged to photodetectors PD1 and PD2, differentially amplified and thresholded as before. By providing uniform unmodulated illumination of the main diagonal the inner product sum of the input vector with itself may be collected at a third photodetector PD3 as described previously.

Figure 6:
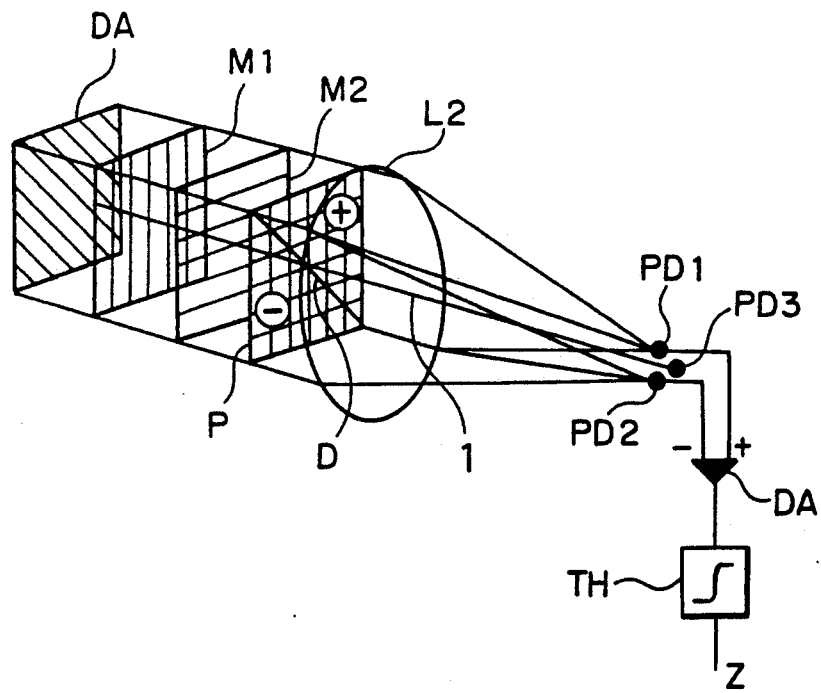
FIG. 6 is a view showing a variant embodiment of the optical system illustrated in FIG. 5.

FIG. 6 shows a variant embodiment of the optical scheme of FIG. 5. The individual light source LA and cylindrical lens CA array of FIG. 5 produce certain difficulties of uniformity of illumination and integration. In FIG. 6 a device comprising a flat, surface-emitting diagonal array of individually addressable light sources DA is shown. Such a device could comprise LED or LD integrated surface-emitting strips. These provide the individual illumination of each diagonal. Thereafter the system is as described for FIG. 5.

For making the device of FIG. 6 more compact, a whole device of FIG. 7 has photodetectors PD4, PD5 and PD6. In the whole device of FIG. 7, DA, M2, M1, PD4, PD5 and PD6 is formed as a plane device. As shown in FIG. 8, these devices are stacked up and integrated to a three-dimensional device.

Figure 9:
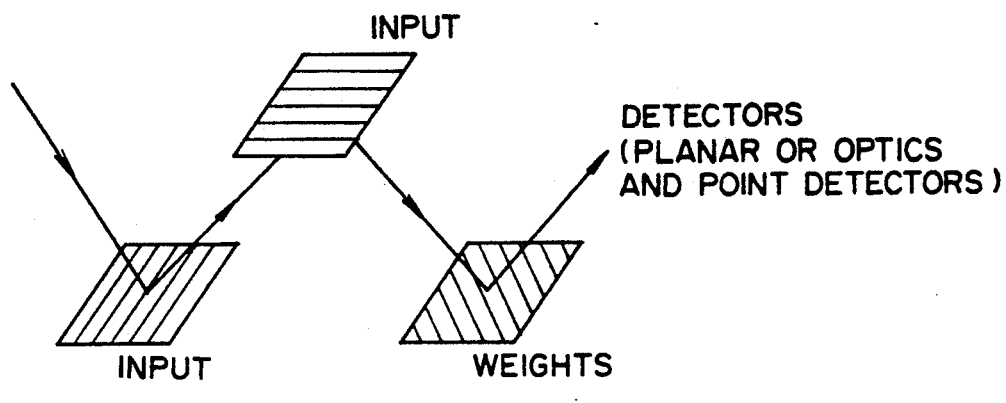
FIG. 9 is a view showing a variant embodiment regarding a reflection geometry.

FIG. 9 shows a variant embodiment regarding a reflection geometry.

Figure 10:
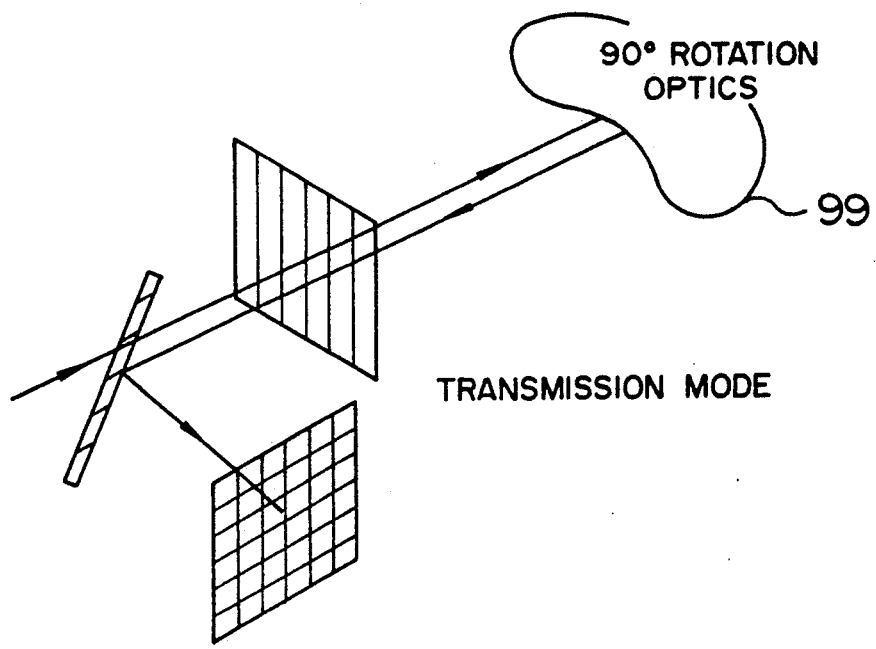
FIG. 10 is a view showing a variant embodiment regarding 90° rotation.

FIG. 10 shows a variant embodiment regarding 90° rotation. In FIG. 10, a single modulator used twice with the image being rotated between first and second pass, means the auto-correlation matrix can be formed using only one device.

Figure 11:
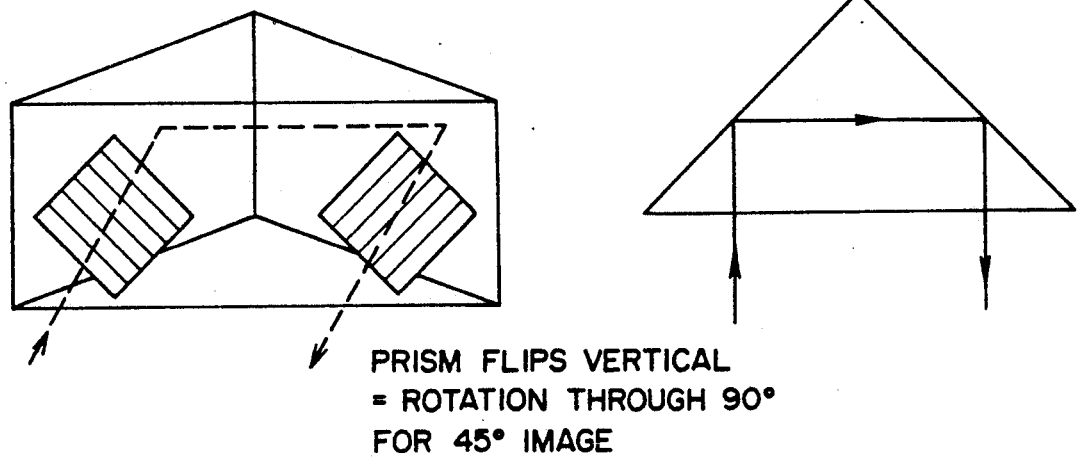
FIG. 11 is a view showing an example in FIG. 10.

FIG. 11 shows an example of FIG. 10. Numeral 99 in FIG. 10 is explained in FIG. 11. In use, the range would be controlably positioned so as to be exactly onto itself.

While preferred embodiments along with variations and modifications have been set forth for disclosing the best mode and important details, further embodiments, variations and modifications are contemplated according to the broader aspects of the present invention, all as set forth in the spirit and scope of the following claims.

An optical system according to the present invention, which utilizes the fact that the weight values of respective diagonals of an auto-correlation matrix are equal to each other, has a weight matrix thereof configured of a one-dimensional modulation unit thereby to simplify the optical configuration for weight multiplication. In addition, the matrix is divided into two matrix data by the main diagonal utilizing the symmetric characteristic of the required information (input vector) with respect to the main diagonal of the auto-correlation matrix, thereby making it possible to multiply both the positive and negative weights at the same time.

We claim:

1. An optical system for a second-order neural network comprising:
   first modulation units for modulating light in accordance with an input signal and producing an auto-correlation matrix symmetric with respect to a main diagonal;
   a second modulation unit including a focus optical system for focusing an output light of the first modulation units in a direction perpendicular to the main diagonal and a one-dimensional modulation array for modulating the light focused at the focus optical system in accordance with weights; and
   detection units for receiving an output light of the second modulation unit on both sides of the main diagonal and converting the output light of the second modulation unit into a plurality of electrical signals.

2. An optical system according to claim 1, wherein the second modulation unit includes a plurality of the focus optical systems and a plurality of the modulation arrays.

3. An optical system according to claim 1, wherein the detection unit further includes a photodetector for producing the inner product of the elements on the main diagonal of the auto-correlation matrix.

4. An optical system according to claim 3, wherein the output of the photodetector is used for error monitoring.

5. An optical system according to claim 3, wherein the output of the photodetector is used for threshold control.

6. An optical system according to claim 1, wherein the first modulation unit includes a one-dimensional linear light source array and a modulator arranged in the direction perpendicular to the one-dimensional linear light source array.

* * * * *